(12) United States Patent
Pannhoff et al.

(10) Patent No.: US 12,372,468 B2
(45) Date of Patent: Jul. 29, 2025

(54) CALIBRATION STANDARD FOR A DEVICE FOR IMAGE-BASED REPRESENTATION OF BIOLOGICAL MATERIAL

(71) Applicant: EUROIMMUN Medizinische Labordiagnostika AG, Luebeck (DE)

(72) Inventors: Helge Pannhoff, Hamburg (DE); Christian Feirer, Luebeck (DE)

(73) Assignee: Euroimmun Medizinische Labordiagnostika AG, Luebeck (DE)

( * ) Notice: Subject to any disclaimer, the term of this patent is extended or adjusted under 35 U.S.C. 154(b) by 766 days.

(21) Appl. No.: 15/105,480

(22) PCT Filed: Dec. 9, 2014

(86) PCT No.: PCT/EP2014/003287
§ 371 (c)(1),
(2) Date: Jun. 16, 2016

(87) PCT Pub. No.: WO2015/090534
PCT Pub. Date: Jun. 25, 2015

(65) Prior Publication Data
US 2016/0313249 A1    Oct. 27, 2016

(30) Foreign Application Priority Data
Dec. 18, 2013   (DE) ..................... 10 2013 021 097.6

(51) Int. Cl.
*G01N 21/64*     (2006.01)
*G01N 21/27*     (2006.01)
(52) U.S. Cl.
CPC ....... *G01N 21/6458* (2013.01); *G01N 21/278* (2013.01); *G01N 21/6428* (2013.01);
(Continued)
(58) Field of Classification Search
None
See application file for complete search history.

(56) References Cited

U.S. PATENT DOCUMENTS 3,781,089 A    12/1973   Fay et al.
6,471,916 B1   10/2002   Noblett
(Continued)

FOREIGN PATENT DOCUMENTS

CN     101979544 A      2/2011
DE     43 11 543 A1    10/1994
(Continued)

OTHER PUBLICATIONS

Resch-Genger et al., Certified Fluorescence Standards, 2007, BioFiles, 2.5, 19, obtained via https://www.sigmaaldrich.com/technical-documents/articles/biofiles/certifi-ed-fluorescence.html, obtained Oct. 15, 2019.*

(Continued)

*Primary Examiner* — Carolyn Fin
(74) *Attorney, Agent, or Firm* — Grüneberg and Myers PLLC (57) ABSTRACT

The invention relates to a calibration standard (7) for a device (1) for image-based representation of biological material (6) which is excited to luminescence at least regionally during the examination. The device (1) has an illumination unit (2) comprising a radiation source, by which an electromagnetic excitation radiation (15) is emittable. Furthermore, a receptacle (3) is provided, which ensures that the biological material (6) arranged on a carrier (5) is positioned within a beam path of the excitation radiation (15). Moreover, the device has at least one image generating unit (4), which receives luminescence radiation (16) emitted by the biological material (6) on account of the excitation by the excitation radiation (15) and generates an image at least of the regions of the biological material (6) which are excited to luminescence. For calibration purposes, the device has a calibration standard (7), which emits a calibration radiation on account of the excitation by the (Continued)

excitation radiation (15), which calibration radiation is captured by the image generating unit (4), and a calibration signal is generatable in a controller (18) taking account of the captured calibration radiation. The technical solution described is distinguished by the fact that the calibration standard (7) has a housing (9) with, enclosed therein, a substance (12) which is excitable to luminescence, and is fixedly connected to the illumination unit (2) or the receptacle (3) with the aid of a fixing means (19).

18 Claims, 4 Drawing Sheets

(52) U.S. Cl.
CPC .  *G01N 21/6452* (2013.01); *G01N 2021/6417* (2013.01); *G01N 2021/6439* (2013.01); *G01N 2201/062* (2013.01); *G01N 2201/13* (2013.01)

(56) References Cited

U.S. PATENT DOCUMENTS

| | | | |
|---|---|---|---|
| 6,635,487 | B1 | 10/2003 | Lee et al. |
| 7,480,042 | B1* | 1/2009 | Phillips ................. G01N 21/76 356/243.1 |
| 2004/0196455 | A1 | 10/2004 | Ermantraut et al. |
| 2006/0121614 | A1 | 6/2006 | Tokhtuev et al. |
| 2006/0233668 | A1 | 10/2006 | Resch-Genger et al. |
| 2007/0159624 | A1 | 7/2007 | Resch-Genger et al. |
| 2007/0212793 | A1 | 9/2007 | Dejneka et al. |
| 2008/0038835 | A1 | 2/2008 | Westphal et al. |
| 2008/0094441 | A1 | 4/2008 | Okamuro et al. |
| 2011/0043618 | A1 | 2/2011 | Salisbury et al. |
| 2011/0076687 | A1 | 3/2011 | Haberstroh et al. |
| 2012/0300055 | A1 | 11/2012 | Salisbury et al. |
| 2013/0027770 | A1 | 1/2013 | Ganser et al. |
| 2013/0344454 | A1* | 12/2013 | Nath .................... A61N 5/0616 433/29 |
| 2014/0199790 | A1 | 7/2014 | Abe et al. |

FOREIGN PATENT DOCUMENTS

| | | |
|---|---|---|
| DE | 199 28 056 A1 | 12/2000 |
| DE | 202 16 998 U1 | 4/2004 |
| DE | 10 2004 047 593 A1 | 4/2006 |
| DE | 10 2005 049 364 A1 | 9/2006 |
| DE | 10 2005 049 365 A1 | 9/2006 |
| DE | 10 2009 041 967 A1 | 3/2011 |
| EP | 1 373 870 B1 | 7/2007 |
| JP | 2003-248790 | 9/2003 |
| JP | 2008-100417 | 5/2008 |
| JP | 2013-029836 | 2/2013 |
| JP | 2013-168533 | 8/2013 |
| WO | 01/35074 A1 | 5/2001 |
| WO | WO 2009/127424 A2 | 10/2009 |

OTHER PUBLICATIONS

Gaigalas AK, Li L, Henderson O, Vogt R, Barr J, Marti G, Weaver J, Schwartz A. The Development of Fluorescence Intensity Standards. J Res Natl Inst Stand Technol. Apr. 1, 2001;106(2):381-9. doi: 10.6028/jres.106.015. PMID: 27500028; PMCID: PMC4862808. (Year: 2001).*

International Search Report issued Mar. 18, 2015 in PCT/EP2014/003287 filed on Dec. 9, 2014.

Office Action issued Jan. 9, 2015 in German Application No. 10 2013 021 097.6 (with English language translation).

Office Action issued May 29, 2019 in Chinese Application No. 201480073429.1 with English translation (15 pages).

Office Action issued Nov. 14, 2018 in Japanese Application No. 2016-540487 with English translation (7 pages).

Office Action issued Jun. 25, 2019 in Japanese Application No. 2016-540487 with English translation (7 pages).

Office Action issued Oct. 14, 2019 in European Application No. 14821497.6 with English translation, 7 pages.

Preliminary Office Action issued Mar. 12, 2020 in Brazilian Application No. BR112016013866-0 with English translation, 7 pages.

Gottfried Schröder, Technische Fotografie, Grundlagen und Anwendungen in Technik und Wissenschaft, Kamprath-Reihe Kompaktlehrbuch Technik, Vogel-Verlag, 1981, pp. 88-93.

* cited by examiner

CALIBRATION STANDARD FOR A DEVICE FOR IMAGE-BASED REPRESENTATION OF BIOLOGICAL MATERIAL

The invention relates to a calibration standard and to a device for the image-based representation of biological material, in which a corresponding calibration standard is integrated. The essential components of a generic device include an illumination unit having a radiation source, which emits electromagnetic excitation radiation, and a receptacle for positioning the biological material that is arranged on a carrier within a beam path of the excitation radiation. Also provided is an image generating unit which receives luminescence radiation emitted by the biological material in response to the excitation with the excitation radiation and generates an image at least of the regions of the biological material that are excited to luminescence. Provided is also a calibration standard which emits a calibration radiation in response to the excitation with the excitation radiation, which calibration radiation is recorded by the image generating unit, and a calibration signal is generatable in a controller taking into account the recorded calibration radiation.

BACKGROUND OF THE INVENTION

Field of the Invention

In particular in the field of in vitro diagnostics, fluorescence examinations are often carried out when examining human or animal samples. Depending on the analysis methods used, fluorescence images are recorded and evaluated here using various systems. So as to nevertheless be able to compare the respective results, it is important that the device-specific influences on the fluorescence signal can be ascertained and correspondingly corrected. Especially important in this context is the use of calibration or fluorescence standards for the device calibration, the radiation intensity of which can be traced to certified standards.

The significance of such standards becomes clear from a project that was carried out together by the National Metrology Institute of Germany (Physikalisch Technische Bundesanstalt (PTB)), the Federal Institute for Materials Research and Testing (Bundesanstalt früMaterialforschung und -prüfung (BAM)) and the companies Gigahertz-Optik GmbH and Sigma-Aldrich GmbH. As part of this project, a radiometric traceability chain for fluorescence standards was developed, consisting of three essential elements. First, a compact, homogeneously light-emitting Ulbricht spherical emitter is provided, the spectral radiance of which was reduced by several orders of magnitude compared to a tungsten band lamp, such that its radiation properties are significantly better matched to a fluorescent sample than traditional radiance standards. The second element is a reference fluorometer having minimum optical imaging errors, which, traced back via the radiance standard, allows the certification of the fluorescence spectrum with sufficiently small radiometric measurement uncertainties. The third element of the traceability chain is the calibration set "Spectral fluorescence standards BAM-F001–BAM-F005" whose corrected emission spectra were certified by the BAM in January 2006. These standards allow a user to ascertain and correct the relative spectral sensitivity of the emission channel of fluorescence measuring systems under application-relevant conditions in a relatively easy and traceable manner.

For the practical performance of examinations, numerous devices for recording and evaluating luminescence images, in particular fluorescence images, with which samples of biological material are examined are known from the prior art. Such devices frequently have a microscope or a camera unit with which in each case recordings of biological samples labeled with a fluorescent dye are generated. Also known are microarray scanners with which fluorescently labeled DNA samples, which are arranged on what are known as bio chips, can be examined.

WO 2009/127424 discloses various fluorescence standards that are utilizable for fluorescence spectroscopy. One problem in the known fluorescence standards is frequently that they are not light stable over the application period or easily fade, especially in the case of prolonged exposure or during exposure at high intensities. Moreover, the dyes used in many cases are utilizable only within a narrow spectral range.

Further problems are frequently that they are relatively expensive, unstable in mechanical, thermal and chemical terms and moreover quickly age or dry out, which in turn results in a change in the radiation-dependent fluorescence intensity.

The previously mentioned document discloses in this context various fluorescence standards or fluorescent dyes which are characterized in that a fluorescent mineral or a substance containing a fluorescent mineral is used. The described minerals are natural and/or synthetic minerals.

In addition to mineral-based fluorescent dyes, other dyes, such as polymers, are used as fluorescence standards. EP 1 373 870 B1 discloses a device for referencing fluorescence signals and/or for calibrating fluorescence detection systems which is based on the use of specific polymers. The device described substantially has a non-fluorescent carrier on which, in multiple defined regions, polymer layers with, in part, various thickness and/or composition are applied. The polymer layers are applied on the carrier such that they fluoresce after corresponding irradiation such that the coated carrier can be used as a fluorescence standard.

The described fluorescence standards are used for standardization of experiments that are based on the evaluation of probe arrays, wherein the fluorescence standards with the probes containing biological material are situated on a common carrier. The carriers are epoxidized slides, in which holes are made using ultrasonic drilling that are filled with a fluorescent polymer and subsequently sealed.

For making a diagnosis, first a series of spots of PCR products is applied on a carrier, wherein specifically purified and fluorescence-dye-labeled specific cDNA is immobilized by way of hybridization at the individual PCR spots. These samples are subsequently read using a confocal laser scanner and the results are analyzed, wherein the evaluation takes place taking into account an alignment with the intensities of the different regions of the fluorescence standards.

Starting from the known systems for recording luminescence images, in particular fluorescence images of biological material, and the standards used for the calibration of such systems, the invention is based on the object of specifying a calibration standard that is producible simply and reproducibly and with which the calibration of a corresponding examination device can be carried out relatively simply and accurately. What is essential here first is that the used luminescent substance has a particularly long life, in particular excessively fast fading is avoided, still makes comparatively easy management possible and, moreover, is cost-effective. In particular, the calibration standard should be configured such that the calibration of a corresponding examination unit can be carried out as part of the normal laboratory workflow, during which a large number of different samples must be processed in a short period of time, without much outlay and within a short period of time. Furthermore, the calibration standard should make possible a calibration of an examination unit that is as automated as possible, yet still highly accurate. Furthermore, it should be ensured preferably that even during the manufacture of a large number of examination units, calibration standards for the respective units that are comparable with one another are used. The traceability of the calibration standard to be specified to a recognized standard is therefore another essential feature. The calibration standard should additionally spectrally match, if possible, with the fluorochrome used in the fluorescence application.

SUMMARY OF THE INVENTION

The above-mentioned object is achieved by way of a device as claimed in claim 1 and by way of a calibration standard as claimed in claim 15. The use of the calibration standard according to the invention is furthermore specified in claim 17. Advantageous embodiments of the invention are the subject matter of the dependent claims and are explained in the following description with partial reference to the figures.

The invention relates to a device for the image-based representation of biological material, having an illumination unit having a radiation source, by way of which electromagnetic excitation radiation is emittable. Also provided is a receptacle that ensures that the biological material arranged on a carrier is positioned within a beam path of the excitation radiation. In addition, the device has at least one image generating unit which receives luminescence radiation emitted by the biological material in response to the excitation with the excitation radiation and generates an image at least of the regions of the biological material that are excited to luminescence. For calibration purposes, the device has a calibration standard which emits a calibration radiation in response to the excitation with the excitation radiation, which calibration radiation is recorded by the image generating unit, and a calibration signal is generatable in a controller taking into account the recorded calibration radiation. The invention is characterized in that the calibration standard has a housing having a substance that is enclosed therein and excitable to luminescence, and is connected fixedly with the aid of an attachment means to the illumination unit or the receptacle.

The calibration standard according to the invention is thus a part that represents an essential component of the device for optical examination of biological material.

The calibration standard is in particular an integral constituent part of the device, where it remains even in the case of changing sample carriers and can thus be used for a long period of time or a large number of examinations.

In a first special embodiment of the invention, the housing has a window which is at least partially transparent for the excitation radiation and the luminescence radiation. The housing of the calibration standard is preferably configured as a steel mount, on the upper side of which, that is to say on the side of the calibration standard that faces the radiation source, a window is arranged. On the side of the housing that is located opposite the window, an opening is advantageously provided through which the luminescent substance, in particular a powder, is placed inside the housing during the manufacture of the calibration standard and which is closed after the luminescent substance has been placed, using a stopper, preferably also made of steel, and sealed.

A further advantageous embodiment of the invention makes provision for the window to have a mark for ascertaining a defined distance between the recording unit and the mark. The mark is preferably in the form of crosshairs which serve for the exact and reproducible focusing using an objective lens of the recording unit, wherein in this case, dot-accurate focusing in all three movement directions (X, Y, Z direction) is possible. Objective lenses having 20× or 40× magnification are particularly well-suited for use in the device according to the invention.

Alternatively or additionally, other structures are provided on the surface of the window. These other or further structures are preferably configured such that they ensure further functions, such as for example the definition and calibration of the XY position and/or the origin position and/or the determination of the imaging scale.

According to a special further development of the invention, the substance which is excitable to luminescence is a dye that is excitable to fluorescence, in other words a so-called fluorescent dye. The luminescent or fluorescent dye is advantageously a powder. The use of a mixture of a fluorochrome and a silicon dioxide ($SiO_2$) or quartz is particularly suitable. The fluorochrome is mixed with another substance, in particular with the above-mentioned silicon dioxide, so as to reduce the radiation intensity of the luminescence or fluorescence radiation coming from the calibration standard with respect to a pure fluorochrome in a suitable manner.

Provision is made in another embodiment, alternatively or in addition to diluting the fluorochrome with silicon dioxide ($SiO_2$), for further attenuating means to be provided. It is in particular conceivable in this context to provide the window of the housing of the calibration standard with at least one attenuating means through which the intensity of the luminescence radiation that is emitted by the luminescent substance is reduced as it passes through the window. The attenuating means is preferably arranged on a surface of the window that faces the luminescent substance and has a partially transparent gray filter and/or a perforated grid structure. It is likewise conceivable to configure the window such that it is partially transparent with respect to a spectrum of the emitted luminescence radiation so as to achieve the desired attenuation of the radiation intensity of the luminescence radiation.

Alternatively to the use of a calibration standard with a pulverulent fluorochrome, it is also conceivable to provide so-called nanodots as the luminescent substance in the region of the illumination unit or at the receptacle on which the carrier with the biological material that is to be examined is situated. It is advantageously conceivable here to produce optically pure epoxide resin and to fill a cuvette which in this case forms the housing of the calibration standard. Such a cuvette is preferably inserted into a suitable holder of the receiving unit of a microscope or a microarray scanner. In this case, the cuvette is also an integral part of the examination unit and is fixedly connected thereto. According to a particularly special further development of the invention, this cuvette is introduced or inserted from the outside in the case of calibration.

One essential idea of the invention is that of providing a calibration standard for a device for optically examining biological material that represents part of the device and is thus stable over a long time and, above all, is fixedly connected to the examination device. The housing of the calibration standard preferably has an external thread with which the calibration standard can be screwed into the receptacle that is provided for positioning the carrier having the biological material, for example an XY stage of a microscope or a camera unit or the receiving tray of a microarray scanner. It is likewise conceivable to produce a durable, releasable/fixed connection between the calibration standard and the receiving unit or illumination unit of the examination device using a latch connection or an interference fit.

According to a particular further development of the invention, the calibration standard is configured to be traceable such that measurement results generated using the calibration standard can be traced back to a certified radiation source or to a standard that is calibrated by the certified radiation source. This can be achieved by calibrating the calibration standard using a certified radiation source or using a standard that has been calibrated by a certified radiation source. According to a special further development, a specific mechanical setup having a receptacle for the calibration standard is provided to this end for the manufacture of the calibration standard. A laser diode is furthermore provided, which can be replaced alternatively by another suitable, narrowband radiation source, in particular an LED. According to a special embodiment, it is even conceivable to use a broadband radiation source and to generate a suitable spectrum using optical aids.

The radiation output of the above-described exposure source is preferably measured and adjusted using a calibrated detector. If a laser diode is used as the illumination source, the temperature and radiation output thereof are operated in a stabilized regulated manner. What is advantageous of the narrowband excitation is that the excitation spectrum and the emission spectrum do not significantly overlap and the emission spectrum of the calibration standard can therefore be spectrally measured almost completely.

For measuring the emission spectrum, a spectrometer system is advantageously used which was previously calibrated traceably with a certified radiation source. During the testing of the calibration standard, the latter is excited to radiation with the preferably used laser diode. Subsequently, the emission spectrum is captured with the calibrated spectrometer such that a traceable irradiation intensity measurement to the certified radiation source is ensured. For efficient scattered-light suppression, the spectrometer is provided with a suitable long pass filter which blocks the excitation radiation and transmits the emission radiation. On the basis of a measurement which is carried out like this, the tested calibration standard can be used as a testing means even by the user.

The present invention likewise relates to a calibration standard for calibrating a device for the image-based representation of biological material. The calibration standard has a housing which at least in regions surrounds a substance which is excitable to luminescence, in particular to fluorescence. This housing of the calibration standard is made at least partially of a material that is transparent for excitation radiation and for luminescence radiation emitted by the excited substance. On the outside of the housing, at least one attachment means is furthermore provided, by means of which the calibration standard is attachable in or on the device for image-based representation of biological material. The calibration standard is thus configured such that it can become an integral part of an examination device. According to the invention, the calibration standard is characterized in that the attachment means has a thread, a plug or a latch element, which is suitable in each case for being attached repeatedly at a counterpart of the device having a matching contour.

The luminescent dye used is preferably a fluorescent dye which is arranged inside the housing and is either pulverulent or has at least one fluorochrome and one quartz ($SiO_2$) or has an epoxide resin which is excitable to luminescence or a comparable polymer.

According to a special further development, a calibration standard which is configured according to the invention can be used with a microscope, a camera unit or in the region of a sample receptacle of a microarray scanner, by attaching the calibration standard durably, specifically releasably/fixedly, at the XY stage of a microscope or the camera unit or in the region of the sample receptacle of the microarray scanner.

BRIEF DESCRIPTION OF THE DRAWINGS

The invention will be explained in more detail below without limiting the general concept of the invention with reference to the figures, in which.

DETAILED DESCRIPTION OF THE INVENTION

Figure 1:
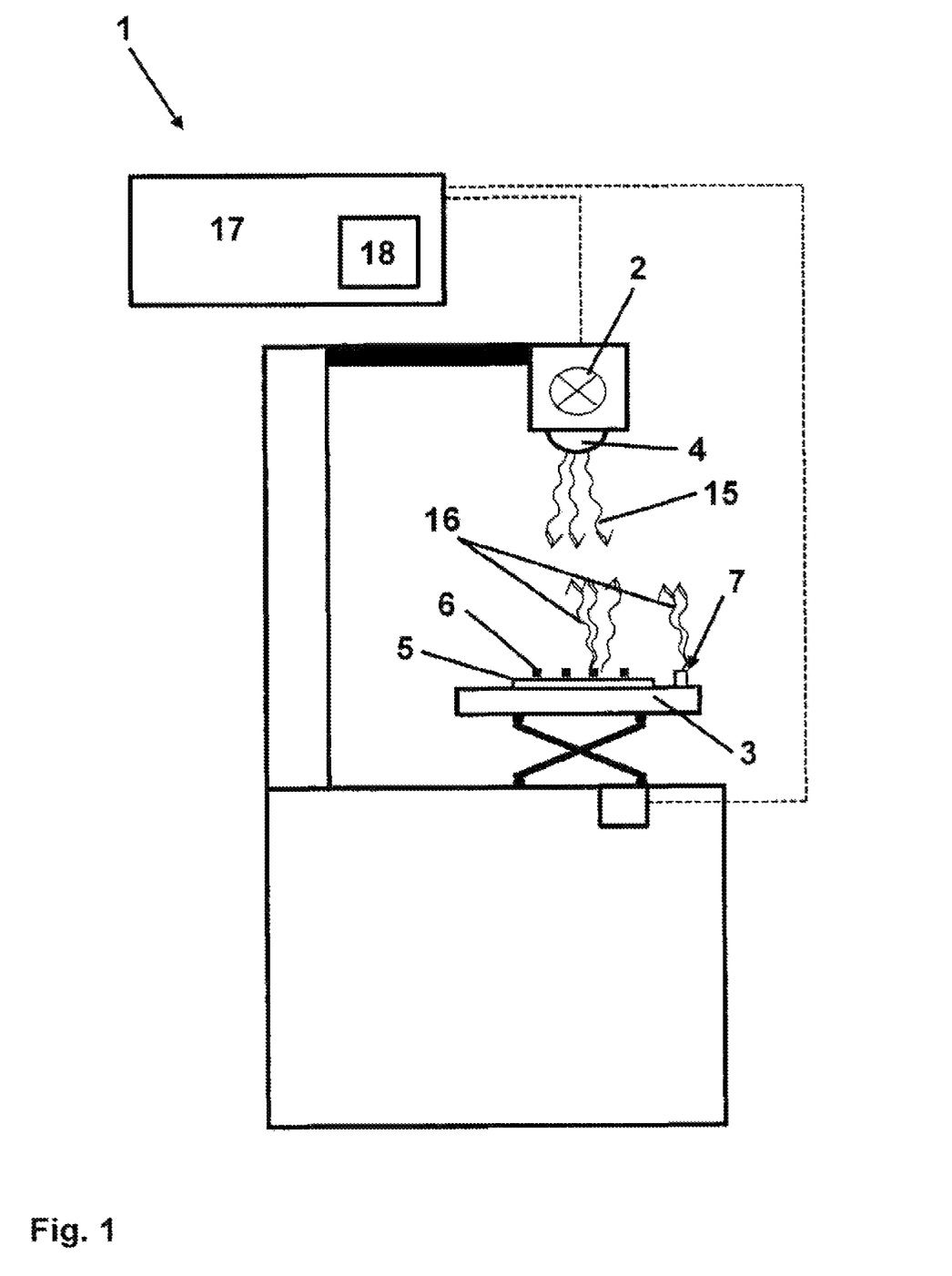
FIG. 1 shows an automatic fluorescence microscope having a calibration standard.

FIG. 1 schematically illustrates a device 1 for optically examining biological material 6, having a calibration standard 7 that is configured according to the invention. The biological material 6 to be examined in this case is tissue sections which are incubated with a patient's serum and at least one fluorescently labeled label. The biological material 6 are arranged on a carrier 5 which in turn is positioned on the receptacle 3 of the examination device 1, in this case an XY stage. The examination device 1 for optically examining biological material 6 used is a fluorescence microscope having a controller 17, which ensures that the examination of the biological material 6 can be effected optionally manually or at least in partially automated fashion. For recording the images of the biological material that is to be examined and labeled with a fluorescent dye, image generating unit 4 for generating images is provided that in an automated process initially focuses on the biological material 6 that is to be recorded in each case and subsequently generates at least one fluorescence image of the biological material 6 and stores it in a data memory 18.

Before the first examination begins, the examination device 1 is first calibrated in the course of the typical laboratory workflow. To this end, a calibration standard 7 is provided at the receptacle 3 of the microscope, which calibration standard has a luminescent dye 12 as a fluorescent powder which is enclosed in a housing 9. The preferably used fluorescent powder is a mixture of a fluorochrome and a silicon dioxide ($SiO_2$), with at least 300 parts of silicon dioxide ($SiO_2$=quartz) per part fluorochrome. The housing 9 of the calibration standard 7 has, on its upper side that is associated with the illumination unit 2 of the examination device 1, in this case a blue LED, a window 8 which is transparent for the excitation radiation and is partially transparent for the fluorescence radiation 16 that is emitted by the fluorescent powder in the excited state. Moreover, a mark for focusing 13 in the form of crosshairs is provided on the window 8 of the housing 9, which mark for focusing 13 is focused using the image generating unit 4 before the calibration operation is carried out. It is possible in this way to ensure that even during the calibration of the examination device 1, the correct distance (Z direction) between the image generating unit 4 and the calibration standard 7 is always set and thus reliable measurement results are obtained. The window 8 moreover has a further mark 14, which makes possible the ascertainment of the starting position and a position of the calibration standard 7 in a plane that is parallel to the receptacle 3 (XY position).

Once the calibration standard 7 has been focused and its position relative to the image generating unit 4 has been fixed, by correspondingly displacing the receptacle 3 of the fluorescence microscope 1, the image generating unit 4 ascertains the radiation intensity of the fluorescence radiation 16 emitted by the calibration standard 7. What is ensured by this calibration is that the fluorescence measurements of the various biological samples 6 carried out after the calibration always give comparable results. The utilized calibration standard 7 is used in particular to realize a standard that ensures and tests the long-term stability of the fluorescence microscope 1. The used luminescent dye 12, in this case a mixture of fluorochrome and silicon dioxide, for its part is characterized by its long-term stability and also by the similarity of its spectrum to the spectrum of the IFT dye that is typically used for the fluorescence labeling of biological material 6, what is known as FITC.

Since the calibration standard 7 that is used according to the invention is a traceable standard, which has been tested spectrometrically with respect to a certified irradiation intensity standard, the calibration standard 7 can be used as a testing means. In addition to the stability, that is to say the comparability between different examination devices 1, it is also possible to use it to test the comparison of the systems among each other.

The illumination unit 2 of the fluorescence microscope 1 has an LED as the radiation source. The excitation using an LED has the huge advantage that, via filtering and imaging up to the detection using the image generating unit 4, the complete imaging chain can be tested and controlled or even regulated continuously using the used calibration standard 7.

Figure 2:
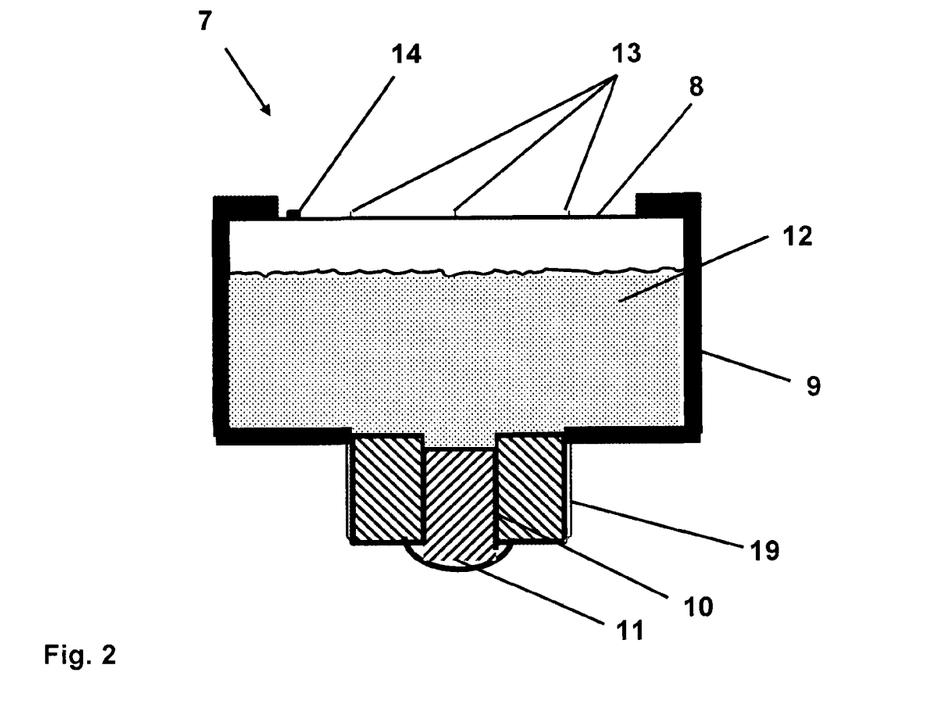
FIG. 2 shows a calibration standard embodied according to the invention.

FIG. 2 shows a detail view of the calibration standard 7 used for calibration. The calibration standard 7 has a steel housing 9, on the upper side of which a window 8 is inserted. The luminescent dye 12 in the form of a pulverulent fluorescence standard used is inserted in the calibration standard 7 during the manufacture thereof through an opening 10 on the underside of the calibration standard 7, and the opening 10 is subsequently closed with a stopper 11 and sealed. The calibration standard 7 moreover has, in the bottom region, an external thread as an attachment means 19, by means of which the calibration standard 7 can be screwed into an internal thread in the receptacle 3 of an examination device 1, correspondingly provided herefor, for producing fluorescence images. The calibration standard 7 is thus fixedly connected to the examination device 1, in particular a fluorescence microscope which is operable in automated fashion and has a image generating unit 4, and thus becomes an integral part of the examination device 1. The calibration standard 7 thus does not have to be repositioned in the beam path of the excitation radiation 15 for each measurement or at each start of a new measurement series.

Mark for focussing 13 as crosshairs are furthermore provided as identifier on the upper side of the window 8. Located below the window 8 is the pulverulent luminescent dye 12, in this case a fluorescent dye, which is realized as a mixture of fluorochrome, in particular based on a doped orthosilicate-silicon dioxide mixture. The mark for focusing 13 in the form of crosshairs arranged on the upper side of the window serve for the exact and reproducible focusing of the calibration standard 7 with the aid of the objective lens, which in this case is part of the image generating unit 4 of a fluorescence microscope with automated operation. Objective lenses having 20×. or 40× magnification are preferably used, and the focusing is effected in the X, Y and Z directions. On account of such focusing of the calibration standard 7, a defined distance between the image generating unit or image generating unit 4, in particular the respective objective lens, and the calibration standard 7 is always set, such that reproducible and homogeneous illumination in the field of view of the image generating unit 4, for example a camera, is ensured. The measurement of the intensity of the fluorescence radiation 16, which is emitted by the calibration standard 7, is thus reproducible.

If further measurements are intended to be carried out using the calibration standard 7, such as for example determination of the imaging scale or the definition and calibration of the XY position and the origin position, further suitable marks 14 are disposed to this end on the upper surface of the window.

Since the luminescent dye 12 used has a high luminance, the radiation intensity is attenuated by way of suitable measures at the calibration standard 7. In this way, the fluorescence radiation of the calibration standard 7 is adapted to the luminance of the fluorescent dye that is typically used for the labeling of the biological material 6 (FITC).

Mixing the pulverulent fluorochrome with silicon dioxide has the largest influence on the attenuation of the radiation intensity. Typically, mixtures are used here in which one part of the fluorochrome is mixed with at least 300 parts of silicon dioxide. Between 180 and 220 mg of the pulverulent mixture of fluorochrome and silicon dioxide can be in the housing 9 of the calibration standard 7.

Figure 3:
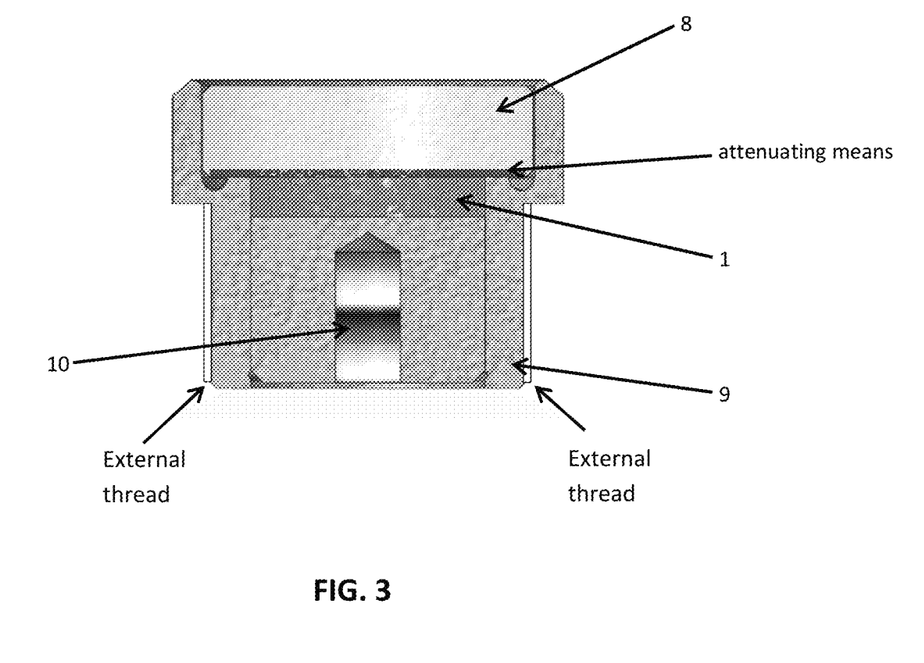
FIG. 3 shows an attenuator overlying a surface of window (8)
Figure 4:
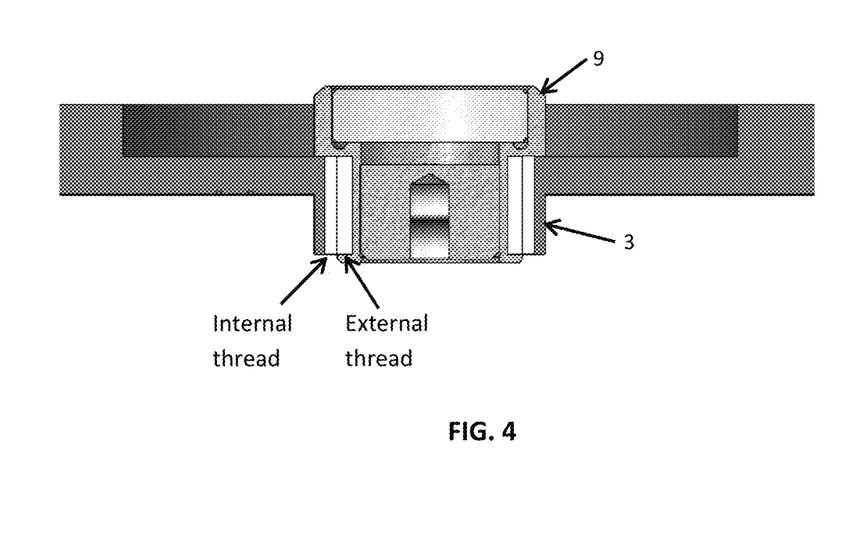
FIG. 4 shows a cut away view of the housing (9) attached to receptable (3).

Further attenuation measures can be carried out at the calibration standard 7 in addition to diluting the fluorochrome with silicon dioxide. For one, the rear side of the window 8 can be overlaid with a partially transparent gray filter which reduces the excitation and emission such that the radiation intensity of the fluorescence radiation 16 emitted by the calibration standard 7 is significantly reduced. The emitted fluorescence radiation 16 is attenuated such that the radiation intensity of the fluorescence radiation 16 of the calibration standard 7 is substantially matched to the radiation intensity of the fluorescence radiation that is emitted by the biological material 7 during the examination.

Alternatively or in addition to the use of a gray filter, it is conceivable for the window 8 to have a perforated grid structure on its rear side, the aspect ratio of which defines the transmittance. Once again a reduction in the radiation intensity of the emitted fluorescence radiation 16 of the calibration standard 7 is achieved. A further variant makes provision for the window 8 to be spectrally partially transparent for the fluorescence radiation 16 coming from the fluorescence standard 7 and possibly also for the excitation radiation 15. In this way, the emitted spectrum can be matched in combination with the emission spectrum of the fluorochrome.

With the use of suitable long pass filters, it is here also possible to match the emission spectrum of the calibration standard 7 to the respective spectra of other fluorescent dyes, which emit for example red light.

Furthermore, the production spread of the standards with respect to one another is reduced owing to a very narrow tolerance of the window thickness. A constant window thickness is ensured during manufacture by polishing the window 8 to the desired final dimensions before it is placed into the housing 9.

The calibration standard 7 illustrated in FIG. 2 and explained previously is especially characterized in that it is traceable to a standard or a reference light source. To ensure this, each calibration standard 7 is calibrated in a mechanical setup after it is manufactured. The mechanical setup here has a receptacle for the calibration standard 7, which is excited to fluorescence radiation using a laser diode. It is conceivable here for the laser diode to be replaced by another suitable narrowband radiation source. The radiation output of the calibration standard 7 that is excited to fluorescence radiation is measured and set using a calibrated detector. The temperature and radiation output of the laser diode are here operated in a stabilized regulated fashion. Through the use of narrowband excitation, overlap of the excitation spectrum and the emission spectrum is reliably prevented such that the emission spectrum of the calibration standard 7 can be measured completely spectrally.

The spectrometer system used for measuring has initially likewise been calibrated traceably with a certified radiation source. The calibration standard 7 is excited to radiation with the laser diode, the emission spectrum is captured with the calibrated spectrometer, such that a traceable luminance measurement to the certified radiation source is ensured. The described calibration standard 7 can therefore be used as a testing means. A certified luminance standard, also known as the "master standard," is preferably used during manufacturing. This is used during the manufacturing of examination devices 1, such as for example fluorescence microscopes with automated operation, for the relative adjustment of the examination devices 1 with the integrated calibration standard 7 that is derived from the master. Fluorescence microscopes which for one are easy to calibrate and are also stable over long periods and also comparable with respect to one another can be provided by way of the calibration standard 7 which is configured according to the invention. This advantage is achieved by the fact that the complete imaging chain can be tested or controlled and even regulated continuously during the manufacture of the calibration standard 7, from excitation by the LED via filtering and imaging up to the detection using the image generating unit 4. In addition, the calibration standard 7 which is configured according to the invention is a constituent part of the examination device 1 and preferably remains at the device over the entire lifetime.

LIST OF REFERENCE SIGNS

1 examination device
2 illumination unit
3 receptacle
4 image generating unit
5 carrier
6 biological material
7 calibration standard
8 window
9 housing
10 opening
11 stopper
12 luminescent dye
13 mark for focusing
14 further mark
15 excitation radiation
16 fluorescence radiation
17 controller
18 data memory
19 attachment means

The invention claimed is:

1. A device for image-based representation of biological material, the device comprising:
   an illuminator having a radiation source of electromagnetic excitation radiation, a receptacle configured to position the biological material at a first location, wherein the biological material is arranged on a carrier, within a beam path of said electromagnetic excitation radiation,
   at least one imager configured to be in communication with a controller, the controller configured to generate a calibration signal corresponding to a calibration radiation, the at least one imager configured to receive luminescence radiation emitted by the biological material and to generate an image of one or more regions of the biological material that are excited to luminescence, and
   a radiation intensity calibration standard at a second location of the receptacle different from the first location and which is not configured for the biological material, the radiation intensity calibration standard configured to emit the calibration radiation in response to the excitation with the excitation radiation, wherein said radiation intensity calibration standard has a housing that is removably attached to the receptacle, wherein a luminescent substance is disposed inside the housing,
   wherein the radiation intensity calibration standard has an intensity reducer that comprises a partially transparent gray filter arranged on a surface of a window that faces the luminescent substance and is configured to reduce the radiation intensity of the luminescent substance to a level that matches a radiation intensity emitted by the biological material, and
   wherein said window has a mark for ascertaining a defined distance between the imager and the calibration standard.

2. The device as claimed in claim 1, wherein said luminescent substance is sealed in the housing of the calibration standard with respect to an environment.

3. The device as claimed in claim 1, wherein said window attenuates the intensity of the calibration radiation that is emitted by the luminescent substance.

4. The device as claimed in claim 3, wherein said window attenuates by at least one structure selected from the group consisting of a transparent gray filter, a perforated grid structure and a structure which is configured to be partially transparent with respect to a spectrum of the excitation radiation, the emitted luminescence radiation or both.

5. The device as claimed in claim 1, wherein said luminescent substance is configured to be in the form of a powder.

6. The device as claimed in claim 1, wherein said luminescent substance being excitable to showing fluorescence.

7. The device as claimed in claim 1, wherein said luminescent substance contains fluorochrome.

8. The device as claimed in claim 1, wherein said luminescent substance is an epoxide resin excitable to luminescence or a polymer excitable to luminescence.

9. The device as claimed in claim 1, wherein said point of attachment is configured as an external thread arranged at the housing.

10. The device as claimed in claim 1, wherein said receptacle is an XY stage of a microscope or a sample receptacle of a microarray scanner.

11. The device as claimed in claim 1, wherein said radiation source of the illuminator includes an LED.

12. The device as claimed in claim 1, wherein the radiation intensity calibration standard has an intensity reducer that is a partially transparent gray filter arranged on a surface of a window that faces the luminescent substance and is configured to reduce the radiation intensity of the luminescent substance to a level that matches a radiation intensity emitted by the biological material.

13. A radiation intensity calibration standard for calibrating a device for an image-based representation of biological material, the radiation intensity calibration standard comprising:
    a housing which at least in regions surrounds a luminescent substance in a housing interior, and is made at least partially of a material that is transparent to excitation radiation and to luminescence radiation, and
    an intensity reducer that comprises a partially transparent gray filter arranged on a surface of a window that faces the luminescent substance configured to reduce the radiation intensity of the luminescent substance to a level that matches a radiation intensity emitted by the biological material,
    wherein said housing comprises a point of attachment on an exterior of said housing which is attachable in or on said device for image-based representation of biological material,
    wherein said point of attachment has a thread, which is suitable for being attached repeatedly at a counterpart of the device having a matching contour, and
    wherein said window has a mark for ascertaining a defined distance between the imager and the calibration standard.

14. The traceable radiation intensity calibration standard as claimed in claim 13, wherein said substance arranged in the housing is either pulverulent and comprises a fluorochrome or is an epoxide resin which is excitable to luminescence or a polymer excitable to luminescence.

15. An XY stage of a microscope, a camera or in a region of a sample receptacle of a microarray scanner, comprising: the radiation intensity calibration standard of claim 13.

16. The device as claimed in claim 1, wherein the window of the housing comprises an attenuating means through which the intensity of the luminescence radiation that is emitted by the luminescent substance is reduced as it passes through the window.

17. The traceable radiation intensity calibration standard as claimed in claim 13, wherein the intensity reducer is a partially transparent gray filter arranged on a surface of a window that faces the luminescent substance configured to reduce the radiation intensity of the luminescent substance to a level that matches a radiation intensity emitted by the biological material.

18. A device for image-based representation of biological material, the device comprising:
    an illuminator having a radiation source of electromagnetic excitation radiation,
    a receptacle configured to position the biological material at a first location, wherein the biological material is arranged on a carrier, within a beam path of said electromagnetic excitation radiation,
    at least one imager configured to be in communication with a controller, the controller configured to generate a calibration signal corresponding to a calibration radiation, the at least one imager configured to receive luminescence radiation emitted by the biological material and to generate an image of one or more regions of the biological material that are excited to luminescence, and
    a radiation intensity calibration standard at a second location of the receptacle different from the first location and which is not configured for the biological material, the radiation intensity calibration standard configured to emit the calibration radiation in response to the excitation with the excitation radiation, wherein said radiation intensity calibration standard has a housing that is removably attached to the receptacle, wherein a luminescent substance is disposed inside the housing,
    wherein the radiation intensity calibration standard has an intensity reducer that is a partially transparent gray filter arranged on a surface of a window that faces the luminescent substance and is configured to reduce the radiation intensity of the luminescent substance to a level that matches a radiation intensity emitted by the biological material,
    wherein the luminescent substance arranged in the housing is either pulverulent and comprises a fluorochrome or is an epoxide resin which is excitable to luminescence or a polymer excitable to luminescence, and
    wherein said window has a mark for ascertaining a defined distance between the imager and the calibration standard.

* * * * *